July 24, 1956  G. HATCH  2,756,319
RADIANT HEATING UNIT AND OVEN
Filed Oct. 29, 1953  2 Sheets-Sheet 1

INVENTOR.
GORDON HATCH
BY
Wheeler, Wheeler & Wheeler
ATTORNEYS

July 24, 1956 G. HATCH 2,756,319
RADIANT HEATING UNIT AND OVEN
Filed Oct. 29, 1953 2 Sheets-Sheet 2

INVENTOR.
GORDON HATCH
BY
Wheeler, Wheeler + Wheeler
ATTORNEYS 2,756,319
RADIANT HEATING UNIT AND OVEN Gordon Hatch, Shorewood, Wis.

Application October 29, 1953, Serial No. 388,955

9 Claims. (Cl. 219—35)

This invention relates to a radiant heating unit and an oven assembled from such units.

Features of the invention include the provision of a unit which may be assembled in any desired numbers to comprise a heat treating oven or the like of any desired dimensions, and in which an individual unit or units may be adjusted to vary the heating effect upon the work. With respect to the specific unit, an organization is provided in which the heat is confined within the oven and prevented from damaging the reflector or casing or the component parts of the unit or the wiring connections to the heating elements which form a part thereof. To this end, the parts are so connected as to minimize heat conductivity and to permit freedom of expansion and contraction and to provide insulation shielding the back walls and wire ways of the units. As an example of the means for minimizing heat conduction through the units from the reflectors to the back walls, the reflectors are mounted on brackets supported by a stack of insulating blocks, the brackets having arms resting on the top blocks of the stacks and other arms interleaved between lower blocks of the stacks, the stacks being positioned by other brackets so interleaved with the blocks of the stack as to avoid any metallic connection between the brackets or even any physical connection between the blocks.

Figure 1:
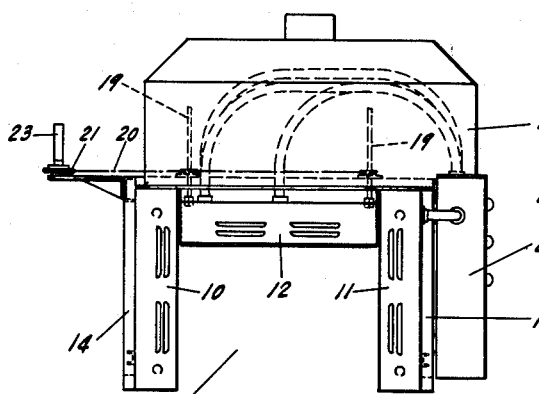
Fig. 1 is a view in front elevation of an oven embodying the invention.

The oven illustrated is shown merely by way of example, since it is one of the features of the present invention that the heating units hereafter to be described may be assembled in a wide variety of organizations to provide an oven of almost any desired dimensions. In the oven illustrated, heating units 10, 11 and 12 provide the sides and top respectively of a heat treating space 13 into which the work may be introduced in any desired manner. The several units 10, 11, and 12 are assembled upon a frame 14 which may conveniently be made of channels to the desired form. The units 10 and 11 are connected to this frame in such a manner as to stand on their sides while the unit 12 is suspended from the horizontal top channels 15. This may conveniently be done by using apertured plates 16 and clamp fingers 17 to locate on the upper surface of channel 15 a suitable number of sprocket nuts 18 threaded onto bolts 19 which support the unit 12.

The several sprocket nuts may be connected by chain 20 with a master sprocket 21 mounted on a bracket 22 for rotation by crank 23. When the crank is turned, the chain 20 trained about the several sprocket nuts 18 will raise and lower the several bolts 19 and heating unit 12 uniformly to increase or decrease the capacity of the heating chamber 13 and to move the top heating unit 12 farther from or closer to the work in such chamber.

Mounted at the side of the oven may be the control panel 25 from which suitable leads 26, 27, some of which are shown in the drawings, run to the various units. The conduits 26 which run to unit 12 are desirably flexible to accommodate the vertical adjustment of unit 12. Accordingly, they are desirably enclosed within the hood 28.

The controls 29 on the panel are provided in any desired number to control individual heating elements of the several units. For this purpose, it is preferred to use timing switches rather than rheostats. Such a switch opens and closes automatically at predetermined intervals so that, without ever permitting the energized resistance element to cool off, it is nevertheless de-energized for a predetermined number of seconds which may be varied in relation to the number of seconds for which it is energized.

Figure 7:
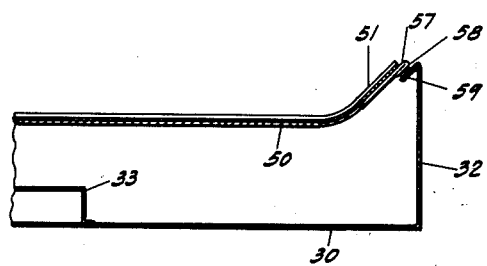
Fig. 7 is a similarly enlarged detail view in transverse section of a side portion of the heating unit of Fig. 5.
Figure 5:
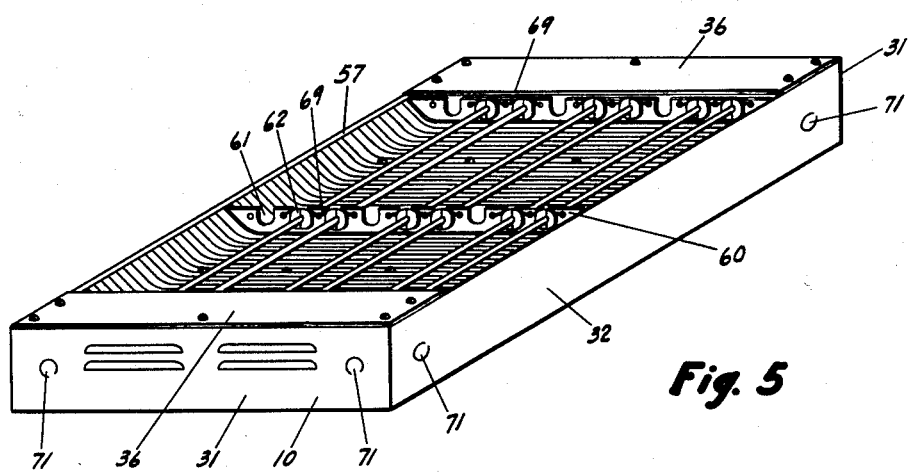
Fig. 5 is a view in perspective of the reflector side of one of the heating units.
Figure 6:
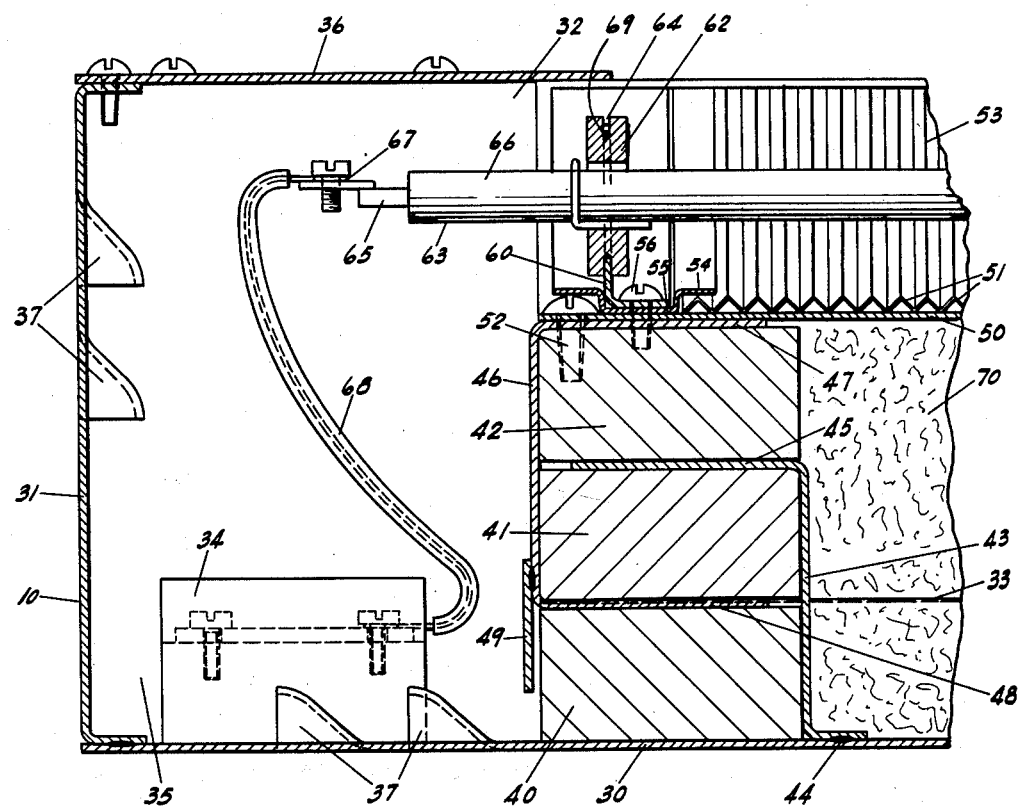
Fig. 6 is a greatly enlarged detail view in longitudinal section of the portion of the unit shown in Fig. 5.

The individual units, which are standardized in construction and reduced to a relatively small number of different sizes, are made as disclosed in Figs. 5 to 7. Each includes a shell open at its face and having a sheet metal rear wall 30, end walls 31, and side walls 32. Extending longitudinally of the rear wall is an inverted channel 33 marginally welded thereto as shown in Fig. 7 and providing a conduit or wire way through which electrical connections may be made leading, for example, to the terminal block 34 provided in the end chamber 35 with which each unit is provided. Each such chamber is enclosed by a top wall section 36 and louvers are provided at 37 for its ventilation, in order that the heat may be carried off.

Spaced from the end walls 31 is a stack of fibrous insulating blocks 40, 41, 42, which may be made of an asbestos composition known commercially as "Marinite." The block 40 rests directly on the rear wall 30 of the shell of the unit. It rests against an upstanding bracket 43 which is welded to the shell at 44 and has a horizontal arm 45 intervening between blocks 41 and 42. A channel shaped bracket 46 has its upper flange 47 resting upon block 42. Its lower flange 48 intervenes between blocks 40 and 41. It is sufficiently short to be spaced substantially from bracket 43. Similarly, the flange 45 of bracket 43 is spaced substantially from the web of flange 46. Projecting from such web in a downward direction to confine block 40 is a depending flange 49, as clearly shown in Fig. 6.

By reason of this arrangement, the several blocks 40, 41, 42 are accurately confined in a stack for the support of plate 50 upon which reflector 51 is mounted. The top block 42 of the stack needs no confining flange because the screws 52 which fasten plate 50 to the flange 47 of bracket 46 extend into the thermal insulating block. Thus the reflector is mounted with no metallic connection whatever to the shell of the unit and heat conduction from the reflector to the shell is resisted by the insulating blocks.

The reflector 51 is desirably provided with zig zag convolutions as shown at 53 in Fig. 6. It rests upon the plate 50 but is not rigidly fastened thereto except at the center. Its end extends beneath the overhanging flange 54 of a retainer 55 which is anchored by screws 56. The sides of the reflector curve upwardly at 57 and terminate near the edge of backing plate 50 which is stiffened by the provision of return flanges 58 spaced at about one sixteenth inch clearance from similar flanges 59 provided along the upper margins of the side walls 32 of the shell.

The inwardly turned flanges 58, 59 leave the unit with a finished appearance along the side margins. Yet the lack of physical contact between the reflector and the shell resists heat transfer to the shell and leaves the reflector free to expand and contract as it heats and cools. It may also contract and expand longitudinally, its end margins being free beneath retainer flange 54.

The same screws 56 which hold the retainers 55 also support angles 60 that extend transversely of the shell at spaced points, particularly at the ends and intermediate the ends of reflector 51. The upstanding flange of each angle is notched at suitable intervals at 61 to receive insulating grommets 62 held in place by wires 69 which pass through holes in angles 60. These grommets are desirably made of porcelain or other electrically insulating and thermally insulating materials. These grommets may conveniently be made in two parts fitted together about the resistance bars 63 and peripherally grooved at 64 to receive the margins of the angle support 60 adjacent the notches 61 therein. The resistance elements 63 may be of any desired construction. As shown, they comprise resistors 65 with a heavy refractory coating 66 from which the end of the bars project to receive electrical connections 67 from which electrical conductors 68 extend to the terminal block 34 above described. The number of resistance elements mounted in any one of the shells of the heating units may be varied according to the requirements of the work. Thus, in Fig. 5, I have illustrated six heating elements arranged in three pairs between and outside of which there are unused notches 61 in which additional heating elements can be incorporated if needed.

Beneath the plate 50 upon which the reflector 51 is supported, the shell is desirably filled around the channel 33 which forms the wire way with fiber glass or other heat resistant and thermally insulating material, as shown at 70 in Fig. 6.

Figure 2:
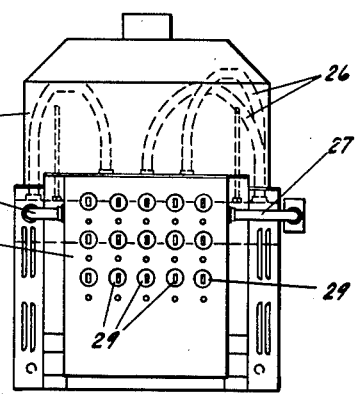
Fig. 2 is a view in side elevation of the oven shown in Fig. 1.
Figure 3:
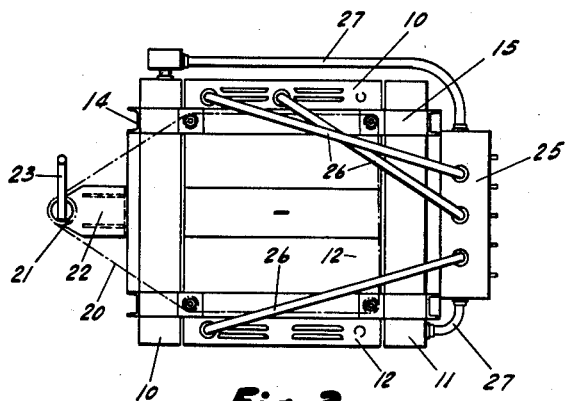
Fig. 3 is a view of the oven in plan as it appears with its hood removed.
Figure 4:
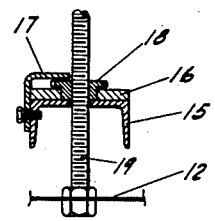
Fig. 4 is a detail view on an enlarged scale showing in transverse section one of the adjusting posts for the upper unit of the oven.

The shell 32 may be provided at 71 with partially severed "knock-outs" for connection of conventional electrical conduits thereto. Thus, although the unit is standardized, it may be connected for use in many ways other than the manner shown in Figs. 1 to 3.

I claim:

1. A heating unit comprising a shell having a plurality of heating elements exposed at one face of the shell, a reflector extending behind said heating elements and having impositive connections to the shell whereby to expand and contract respecting the shell, and non-metallic insulating means disposed within the shell and projecting toward said face at longitudinally spaced points and constituting substantially the sole support for the heating elements and the reflector from the shell, and retaining members mounted on said insulating means and provided with flanges marginally lapping the exposed face of the reflector at opposite ends thereof to retain it on the shell without restraining its expansion and contraction.

2. A heating unit comprising a shell having a plurality of heating elements exposed at one face of the shell, a reflector extending behind said heating elements and free to expand and contract respecting the shell, and insulating means supporting the heating elements and the reflector from the shell, said means having retaining elements mounted thereon and marginally overhanging the reflector to secure it to the shell without restraining its expansion and contraction, said insulating means comprising stacks of insulating blocks at remote points in the shell, a reflector support underlying the reflector and connected with the uppermost block in each stack whereby said blocks are secured against relative displacement toward or from each other, bracket means extending from the uppermost block of the stack in confining relation to other blocks of the stack and having a flange interleaved between two blocks in the stack adjacent the shell, opposed bracket means connected with the shell and engaging blocks of the stack at the side thereof opposite the bracket first mentioned and having a flange engaged between blocks outside of the bracket means first mentioned, whereby the bracket means first mentioned is held against displacement outwardly of the shell and the blocks of said stack are confined in the stack.

3. In a device of the character described, the combination with a support and an electrical heating bar, of a thermally and electrically insulating mounting for said bar comprising a stack of at least three insulating blocks beneath each end of the bar, bracket means connected with the support at one side of each stack and including a flange interleaved between the second and third blocks of the respective stack, bracket means overlying the third block of each stack and extending toward the support at the side of the stack opposite the bracket means first mentioned and including a flange interleaved between the first and second blocks of the respective stack, means connecting the second mentioned bracket means of the respective stacks beneath the bar and including displacement resisting connection to the third block of each stack and means for carrying the bar from the top of each stack.

4. A heating unit comprising a shell having a back and sides and ends and partial face enclosures adjacent the ends, the top face of the shell being open intermediate said partial enclosures, resistance means disposed between the sides of the shell and exposed through the open face thereof, wiring to said resistance means housed behind one of said partial face enclosures and a reflector behind the resistance means within the shell and having its margins in close proximity to the sides of the shell but free thereof for expansion and contraction independently of the shell, together with insulating means within the shell adjacent said partial face enclosures and supporting said reflector and said resistance means, said insulating means being provided with a flange overhanging said reflector at its end and comprising a channel within which said reflector is free for limited expansive and contractive movement.

5. A heating unit of the character described comprising the combination with a shallow pan shaped shell having sides, of a reflector within the shell in the form of a shallow channel having upwardly turned side margins, the shell and reflector having inwardly and reversely disposed flanges in close proximity but substantially free of metallic contact, whereby the shell is substantially closed by the reflector along said side margins and has a finished appearance without thermal conductivity from the reflector to the shell, said shell having non-metallic thermally insulating supports longitudinally spaced within the channel and upon which the reflector rests and is substantially entirely supported from the shell, said reflector having means holding it to said supports for supporting and positioning the reflector independently of its said margins, whereby the margins are free for expansion and contraction.

6. The device of claim 5 in which the means for supporting and positioning the reflector comprises a stack of insulating blocks between the shell and each end of the reflector, bracket means having a flange overlying the top block of each stack and extending down the outside of the stack toward the shell, means connecting such flange with the top block of the respective stack, means connecting the bracket means at opposite ends of the reflector to each other independently of the reflector, bracket means connected with the shell and extending upwardly along the inner side of each stack and having flange means interleaved between the top block of the stack and other blocks of the stack, the bracket means first mentioned having flanges interleaved between the bottom block of the respective stacks and other blocks of such stacks.

7. A device of the character described comprising a pan shaped shell having a bottom and shallow sides and ends and partial top closures adjacent the ends, the top face of the shell being open, stacks of insulating blocks at opposite ends of the shell, bracket means connected with the shell and extending upwardly from the bottom of the shell along one side of each stack and having flanges interleaved between the top block of each stack and other blocks thereof, complementary bracket means at the other side of each stack having a flange engaged over the top block of the respective stack and another flange engaged between the lowermost block of each stack and other blocks thereof, means connecting the bracket means last mentioned across the length of the shell and further connecting such bracket means with the topmost blocks of their respective stacks, retainers mounted on the last mentioned bracket means and provided with overhanging flanges, a reflector having the form of a shallow channel with upturned sides projecting toward the top margins of the sides of the shell, said reflectors being confined beneath the overhanging flanges of the retainers whereby the reflectors are positioned intermediate their side margins, the latter being free for expansion and contraction, supporting means extending transversely of the shell and provided at intervals with notches, grommets mounted in respective notches, electrical resistor heating bars mounted in the grommets and electrical connections to such bars housed in the ends of the shell.

8. The device of claim 7 in which the reflector is convoluted and the margins of the reflector and of the side walls of the shell have complementary reversely turned flanges mutually spaced to provide clearance between the reflector and the shell.

9. An oven comprising the combination with a frame, of substantially identical self contained oven side heating units respectively mounted on edge at opposite sides of the frame and adjustably mounted face down between the side units and constituting an oven sides and top, each of said units comprising a housing pan having an open face, a concave reflector in the pan and substantially coextensive with said face, electrical resistance heating elements within respective reflectors, each housing pan unitarily having conduit means and conductors therein leading to said heating elements, together with electrical supply connections to the pan conductors, the supply connections to the oven top unit conductors being flexible.

References Cited in the file of this patent
UNITED STATES PATENTS

| | | |
|---|---|---|
| 828,029 | Jackson | Aug. 7, 1906 |
| 1,479,819 | Kluever | Jan. 8, 1924 |
| 1,686,865 | Klotz | Oct. 9, 1928 |
| 2,377,946 | Leary | June 12, 1945 |
| 2,392,796 | Berg | Jan. 8, 1946 |
| 2,446,822 | Grapp | Aug. 10, 1948 |
| 2,744,946 | Lewicki | May 8, 1956 |

FOREIGN PATENTS

| | | |
|---|---|---|
| 576,829 | Great Britain | Apr. 23, 1946 |